(12) United States Patent
Dai et al.

(10) Patent No.: US 10,061,104 B2
(45) Date of Patent: Aug. 28, 2018

(54) IMAGE PICK-UP LENS SYSTEM AND MODULE AND TERMINAL THEREFOR

(71) Applicant: Zhejiang Sunny Optics Co., Ltd, Zhejiang (CN)

(72) Inventors: Fujian Dai, Zhejiang (CN); Lin Huang, Zhejiang (CN)

(73) Assignee: ZHEJIANG SUNNY OPTICS CO., LTD, Zhejiang (CN)

( * ) Notice: Subject to any disclaimer, the term of this patent is extended or adjusted under 35 U.S.C. 154(b) by 0 days.

(21) Appl. No.: 15/126,946

(22) PCT Filed: Jun. 3, 2014

(86) PCT No.: PCT/CN2014/079057
§ 371 (c)(1),
(2) Date: Sep. 16, 2016

(87) PCT Pub. No.: WO2015/143778
PCT Pub. Date: Oct. 1, 2015

(65) Prior Publication Data
US 2017/0097493 A1      Apr. 6, 2017

(30) Foreign Application Priority Data

Mar. 23, 2014   (CN) .......................... 2014 1 0109113
Mar. 23, 2014   (CN) ...................... 2014 2 0133035 U

(51) Int. Cl.
*G02B 13/08*      (2006.01)
*G02B 3/02*       (2006.01)
(Continued)

(52) U.S. Cl.
CPC ......... *G02B 13/0045* (2013.01); *G02B 1/041* (2013.01); *G02B 9/62* (2013.01)

(58) Field of Classification Search
CPC ....... G02B 13/0045; G02B 9/62; G02B 1/041
See application file for complete search history.

(56) References Cited

U.S. PATENT DOCUMENTS 8,411,376 B2    4/2013   Kubota
8,908,295 B1 *  12/2014  Tsai .................. G02B 9/60
                                                    359/713

FOREIGN PATENT DOCUMENTS

CN    101950066 A    1/2011
CN    201837770 U    5/2011
(Continued)

OTHER PUBLICATIONS

International Search Report and Written Opinion for Int'l Application No. PCT/CN2014/079057, titled: Image Pickup Lens and Module Thereof and Terminal, dated Dec. 24, 2014, Including English Translation of Search Report.
(Continued)

*Primary Examiner* — Alicia M Harrington
(74) *Attorney, Agent, or Firm* — Hamilton, Brook, Smith & Reynolds, P.C.

(57) ABSTRACT

An embodiment of the present invention provides an image pick-up lens system, an imaging module having the image pick-up lens system, and a terminal having the imaging module. The system includes the following lenses arranged sequentially from an object side to an image side: a first lens with positive focal power; a second lens with negative power, having a convex object-side surface; a third lens with negative power; a fourth lens; a fifth lens with positive power, having a convex image-side surface; and a sixth lens having a concave image-side surface near an optical axis. With proper focal power allocation and a large aperture diameter configuration, the length of the lens system is effectively shortened, aberration is reduced, and imaging quality is improved.

9 Claims, 10 Drawing Sheets

(51) Int. Cl.
*G02B 13/00* (2006.01)
*G02B 1/04* (2006.01)
*G02B 9/62* (2006.01)

(56) References Cited

FOREIGN PATENT DOCUMENTS

| | | |
|---|---|---|
| CN | 103576296 A | 2/2014 |
| CN | 103576297 A | 2/2014 |

OTHER PUBLICATIONS

International Preliminary Report on Patentability for Int'l Application No. PCT/CN2014/079057, titled: Image Pickup Lens and Module Thereof and Terminal, dated May 24, 2016, Including English Translation.

\* cited by examiner

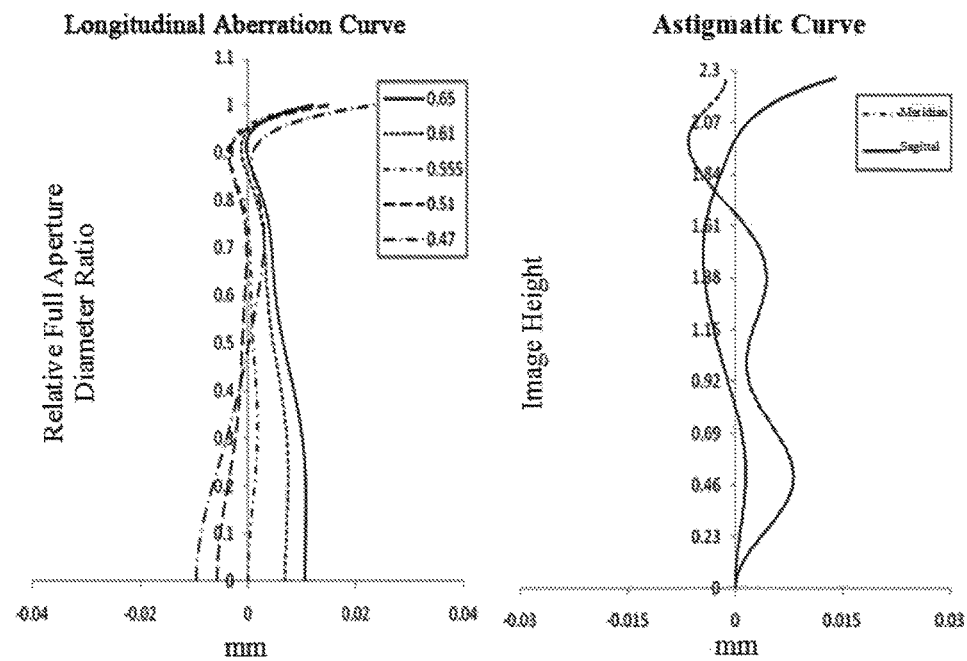
Fig. 7
Fig. 8
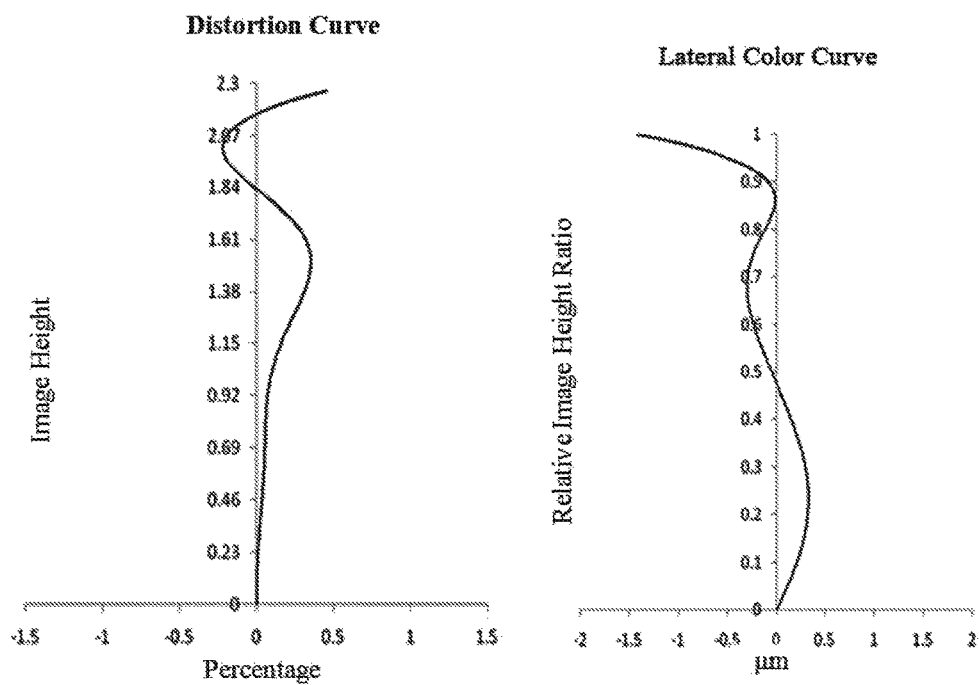
Fig. 9
Fig. 10

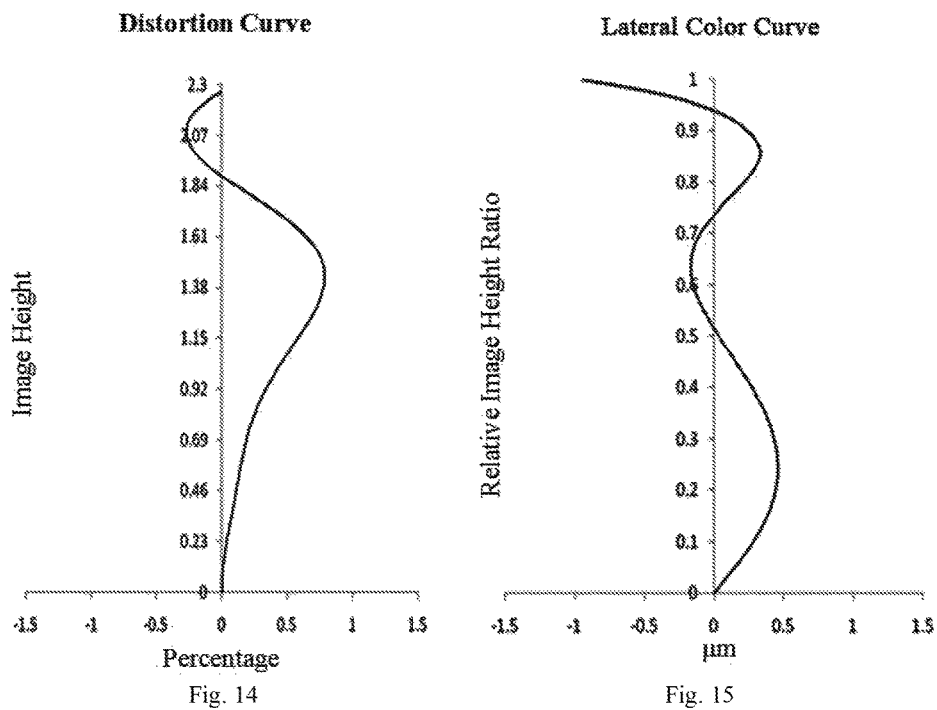
Fig. 14                    Fig. 15
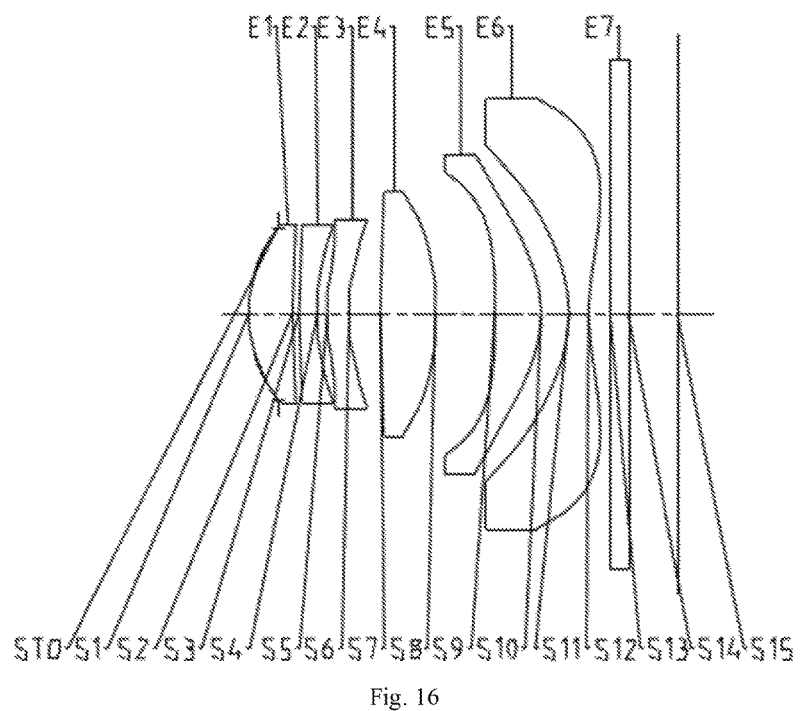
Fig. 16

IMAGE PICK-UP LENS SYSTEM AND MODULE AND TERMINAL THEREFOR

RELATED APPLICATIONS

This application is the U.S. National Stage of International Application No. PCT/CN2014/079057, filed on Jun. 3, 2014, which designates the U.S., published in Chinese, and claims priority under 35 U.S.C. § 119 or 365(c) to Chinese Application No. CN201410109113.5, filed Mar. 23, 2014 and Chinese Application No. CN201420133035.8, filed Mar. 23, 2014. The entire teachings of the above application(s) are incorporated herein by reference.

TECHNICAL FIELD

The present invention relates to a lens imaging optical system, in particular to an image pick-up lens system composed of six sets of lenses.

BACKGROUND OF THE INVENTION

In recent years, with the development of chip technologies, such as those for CCD or CMOS, the pixel sizes of chips become smaller and smaller, and the requirement for the imaging quality of the associated optical system becomes higher and higher. As a result, the image pick-up lens system has been developed gradually towards a trend of higher pixel resolution and miniaturization. To adapt to that trend, it is further necessary for the optical lenses mounted on electronic products, such as cell phones or digital cameras, to have a high resolution and other properties.

At present, ordinary high-pixel thin lens systems often employ a five-lens structure. For example, the lens system disclosed in the U.S. Pat. No. 8,411,376B2 comprises the following lenses arranged sequentially from the object side to the image side: a first lens with positive focal power, a second lens with negative focal power, a third lens with negative focal power, a fourth lens with positive focal power, and a fifth lens with negative focal power. Among small aperture diameter configurations, such a system effectively improves the imaging quality while maintaining the miniaturized feature. However, as portable electronic products have been developed well, higher requirements have been put forth for the pixels, imaging quality, and resolution performance, etc. of miniaturized image pick-up lens system. To meet the requirement for high resolution, a large aperture diameter configuration has to be used so that the requirement for illuminance can be met. However, with the known five-lens structure, it is not possible to further shorten the system length and meet the requirement for image quality in a large aperture diameter configuration.

Hence, to meet the requirement for high resolution and high image quality, the present invention provides a six-lens structure, which meets the requirement for high resolution by utilizing a large aperture diameter and ensures miniaturization of the lens system by reducing the lens thickness or the spacing between the lenses; in addition, the present invention further provides an imaging module having the above-mentioned lens system, and a portable terminal having the imaging module, so as to obtain high-quality photographic images.

SUMMARY OF THE INVENTION

To the above-mentioned problems, the present invention provides an optical imaging lens system in an embodiment which is applicable to portable electronic products, has a large aperture and a high pixel resolution, can attain a high imaging quality, and is miniaturized; in addition, and the present invention further provides an imaging module having the lens system, and a portable terminal having the imaging module, so as to obtain high-quality photographic images. The technical solution is as follows:

An image pick-up lens system, comprising the following lenses arranged sequentially from an object side to an image side: a first lens with positive focal power; a second lens with negative focal power, having a convex object-side surface; a third lens with negative focal power; a fourth lens with focal power; a fifth lens with positive focal power, having a convex image-side surface; and a sixth lens with focal power, having a concave image-side surface near an optical axis, wherein, the lenses meet the following relational expression:

$$5.5 < f1.2.3/Dr1r6 < 10$$

where, f1.2.3 is a combined focal length of the first lens, second lens, and third lens; Dr1r6 is a spacing from an object-side surface of the first lens to an image-side surface of the third lens on the optical axis.

In a further embodiment, the lenses meet the following relational expression:

$$0.25 < T3.5/TTL < 0.5$$

where, T3.5 is the spacing from the image-side surface of the third lens to the object-side surface of the fifth lens on the optical axis; TTL is the total length of the entire lens system.

In a further embodiment, the lenses meet the following relational expression:

$$-5.0 < SAG61/CT6 < -2.5$$

where, SAG61 is the distance from a point of intersection between the object-side surface of the sixth lens and the optical axis to the horizontal displacement of the maximum effective aperture diameter position of the surface on the optical axis; CT6 is the central thickness of the sixth lens on the optical axis.

In an embodiment of the lens system, the object-side surface of the first lens is a convex surface; the image-side surface of the third lens is a concave surface; the image-side surface of the fourth lens is a convex surface.

In an embodiment of the lens system, the focal power of the fifth lens is positive focal power near the optical axis and turns to be negative focal power towards the circumference; the focal power of the sixth lens near the circumference is positive focal power.

In an embodiment of the lens system, at least one lens surface is an aspherical surface.

A diaphragm in an embodiment is arranged between the object for image pick-up and the first lens.

In a further embodiment, in the lens system, the lenses are plastic aspherical lenses.

In an embodiment of the image pick-up lens system provided in the present invention, the combined focal length of the first lens, second lens, and third lens is positive, the object-side surface of the first lens is a convex surface, and the image-side surface of the third lens is a concave surface. Such type of combination of the lenses can effectively shorten the length of the lens system and ensure miniaturization of the lenses. Furthermore, in an embodiment, the first lens has positive focal power, the second lens has negative focal power, and the third lens has negative focal power. Such a focal power allocation is beneficial for reducing the aberration influence on the lens system and improving the imaging quality of the lens system. The fifth lens has positive focal power, and the image-side surface of the fifth lens is a convex surface. Thus, the focal length allocation of the lens system can be effectively balanced, the off-axis aberration of the system can be corrected, and thereby the imaging quality of the lens system can be improved.

In an embodiment of the image pick-up lens system, the image-side surface of the fourth lens is a convex surface. Thus, the light rays can be concentrated effectively, the effective radii of the lenses can be reduced, the size of the image pick-up lens system can be decreased, and thereby the miniaturization of the system is ensured.

In an embodiment of the image pick-up lens system, the fifth lens has negative focal power at the circumference and the sixth lens has positive focal power at the circumference. Such focal power allocation can decrease the angle of incidence of the principal rays to the image surface in the marginal area, ensure the light utilization efficiency, improve the imaging capability of the system, and meet the requirement for high resolution.

In an embodiment of the image pick-up lens system in the present invention, at least one lens surface is an aspherical surface, and the lenses are made of a plastic material, so as to obtain more control variables. Thus, by means of reasonable focal power allocation, the aberration correction can be improved, the imaging quality by the lens system can be improved, the lens sizes can be reduced effectively, and the requirement for high image quality and miniaturization of portable electronic products can be met.

The present invention further provides an imaging module in an embodiment, which has a chip for photoelectric conversion and employs the above-mentioned image pick-up lens system, and can be used to obtain high-resolution and high-quality photographic images.

The present invention further provides a portable terminal in an embodiment having the above-mentioned imaging module, which can be used to obtain high-resolution and high-quality photographic images.

DESCRIPTION OF THE DRAWINGS

FIG. 7 is a longitudinal aberration curve (mm) of the Embodiment 2;
FIG. 8 is an astigmatic diagram (mm) of the Embodiment 2;
FIG. 9 is a distortion diagram (%) of the Embodiment 2;
FIG. 10 is a lateral color curve (μm) of the Embodiment 2;
FIG. 14 is a distortion diagram (%) of the Embodiment 3;
FIG. 15 is a lateral color curve (μm) of the Embodiment 3;
FIG. 16 is a schematic diagram of an Embodiment 4 of the image pick-up lens system provided in the present invention.

DESCRIPTION OF EXEMPLARY EMBODIMENTS

Figure 1:
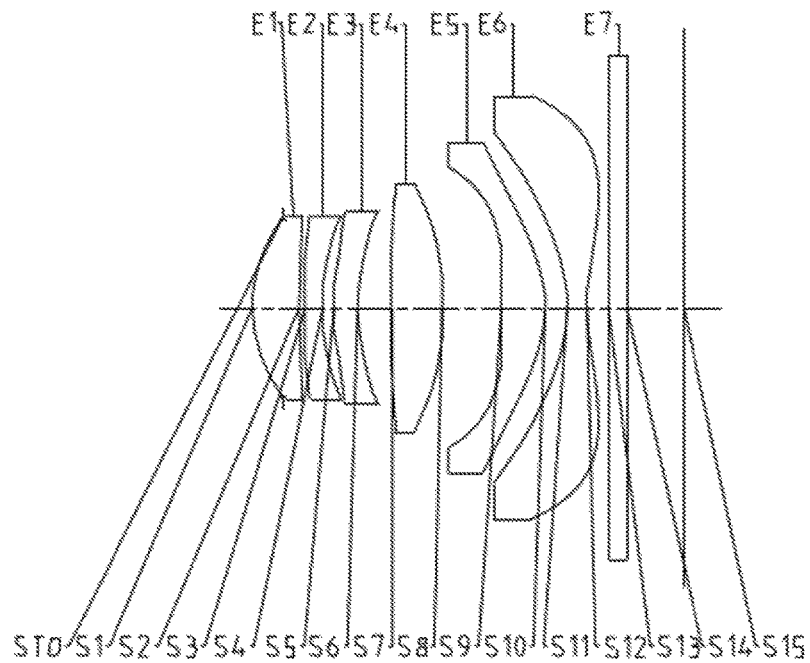
FIG. 1 is a schematic diagram of an Embodiment 1 of the image pick-up lens system provided in the present invention.
Figure 2:
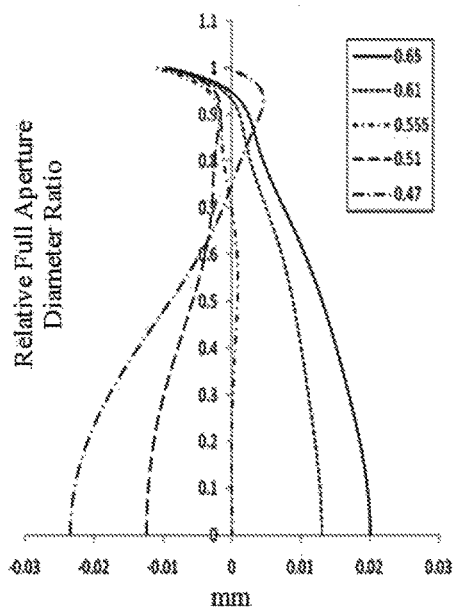
FIG. 2 is a longitudinal aberration curve (mm) of the Embodiment 1.
Figure 3:
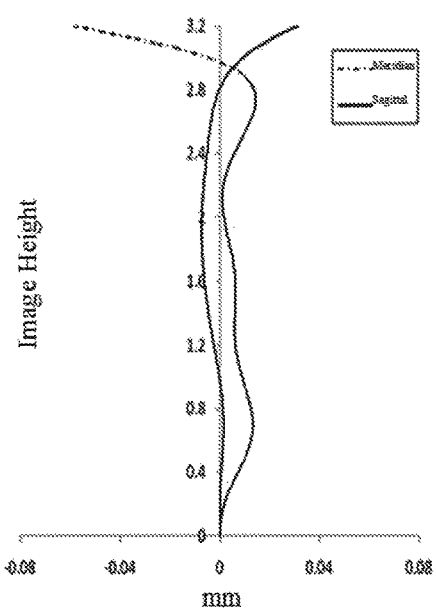
FIG. 3 is an astigmatic diagram (mm) of the Embodiment 1.
Figure 4:
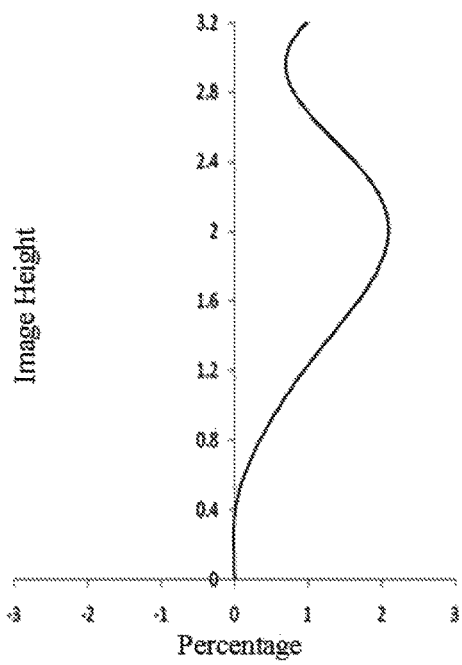
FIG. 4 is a distortion diagram (%) of the Embodiment 1.
Figure 5:
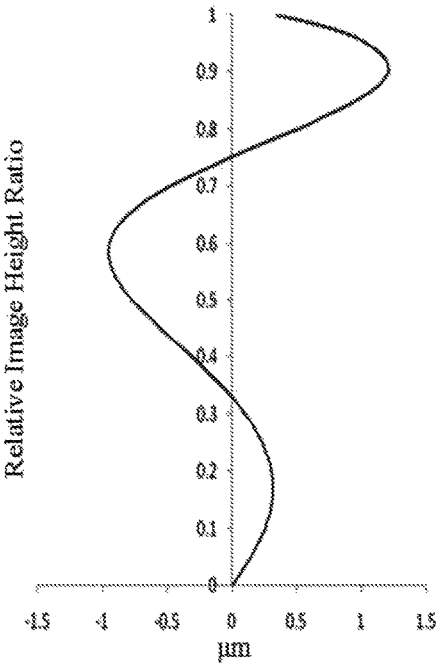
FIG. 5 is a lateral color curve (μm) of the Embodiment 1.

The image pick-up lens system provided in an embodiment of the present invention comprises the following lenses arranged sequentially from an object side to an image side: a first lens with positive focal power; a second lens with negative focal power, having a convex object-side surface; a third lens with negative focal power; a fourth lens with focal power; a fifth lens with positive focal power, having a convex image-side surface; and a sixth lens with focal power, having a concave image-side surface near an optical axis; and at least one lens surface is an aspherical surface, and a diaphragm is arranged between the object for image pick-up and the first lens.

Wherein, the image pick-up lens system meet the following relational expressions:

$$5.5 < f1.2.3/Dr1r6 < 10$$

$$0.25 < T3.5/TTL < 0.5$$

$$-5.0 < SAG61/CT6 < -2.5$$

where, f1.2.3 is a combined focal length of the first lens, second lens, and third lens; Dr1r6 is a spacing from an object-side surface of the first lens to the image-side surface of the third lens on the optical axis; T3.5 is a spacing from the image-side surface of the third lens to an object-side surface of the fifth lens on the optical axis; TTL is a total length of the entire lens system; SAG61 is a distance from a point of intersection between an object-side surface of the sixth lens and the optical axis to a horizontal displacement of the maximum effective aperture position of the surface on the optical axis; CT6 is a central thickness of the sixth lens on the optical axis.

Since the image pick-up lens system meets the relational expression 5.5<f1.2.3/Dr1r6<10, the length of the lens system can be further shortened, and the miniaturization of the lenses can be ensured. If f1.2.3/Dr1r6>10, it is adverse to astigmatic correction, and the axial chromatic aberration in the central viewing field may be increased; if f1.2.3/Dr1r6<5.5, the spacing from the object-side surface of the first lens to the image-side surface of the third lens may be too large, adverse to the miniaturization of the lenses.

Since the image pick-up lens system meets the relational expression 0.25<T3.5/TTL<0.5, the spacing(s) between the lenses can be balanced effectively, the angle of incidence of the main ray can be decreased, and thereby the sensibility of the system can be reduced, beneficial for the manufacturing of the lenses. If T3.5/TTL>0.5, the axial spacing from the third lens to the fifth lens may be increased; thus, in order to ensure miniaturization of the lenses, the spacing from the first lens to the third lens may be decreased excessively, which is adverse to distortion correction; if T3.5/TTL<0.25, the system sensibility may be increased owing to the influence of the angle of incidence of the main ray, adverse to the manufacturing of the lenses.

The values of the lenses that meet the above-mentioned conditional expressions in the embodiments are shown in the following table:

| Conditional Expression | Embodiment 1 | Embodiment 2 | Embodiment 3 | Embodiment 4 | Embodiment 5 | Embodiment 6 |
|---|---|---|---|---|---|---|
| 5.5 < f1.2.3/Dr1r6 < 10 | 5.930 | 5.650 | 9.487 | 6.549 | 7.681 | 7.005 |
| 0.25 < T3.5/TTL < 0.5 | 0.334 | 0.281 | 0.309 | 0.340 | 0.443 | 0.346 |

In the image pick-up lens system defined in the embodiment(s) of the present invention, at least one lens surface is an aspherical surface, and the lenses are made of a plastic material, so as to obtain more control variables. Thus, by means of reasonable focal power allocation, it is helpful for the aberration correction, the imaging quality of the lens system can be improved, the lens sizes can be reduced effectively, and the requirement for high image quality and miniaturization of the lens system applicable to portable electronic products can be met.

Hereinafter, the present invention will be detailed with reference to the accompanying drawings:

The embodiments of the image pick-up lens system provided in the present invention are described as follows:

As shown in FIG. 1, the image pick-up lens system provided in Embodiment 1 of the present invention comprises the following components arranged sequentially from the object side to the image side: a diaphragm, a first lens E1, a second lens E2, a third lens E3, a fourth lens E4, a fifth lens E5, a sixth lens E6, a filter lens E7, and an imaging plane. The first lens E1 has positive focal power, with a convex object-side surface; the second lens E2 has negative focal power, with a convex object-side surface; the third lens E3 has negative focal power, with a concave image-side surface; the image-side surface of the fourth lens E4 is a convex surface; the fifth lens E5 has positive focal power, with a convex image-side surface, and the positive focal power near the optical axis turns to be negative focal power towards the circumference; the sixth lens E6 has positive focal power at the circumference, with a concave image-side surface near the optical axis. In the image pick-up lens system, at least one lens surface is an aspherical surface.

From the object side to the image side, the diaphragm has its plane denoted as ST0, the two sides of the first lens E1 are denoted as S1 and S2, the two sides of the second lens E2 are denoted as S3 and S4, the two sides of the third lens E3 are denoted as S5 and S6, the two sides of the fourth lens E4 are denoted as S7 and S8, the two sides of the fifth lens E5 are denoted as S9 and S10, the two sides of the sixth lens E6 are denoted as S11 and S12, the two sides of the filter lens E7 are denoted as S13 and S14, and the imaging plane is denoted as S15.

The parameters of the image pick-up lens system in the Embodiment 1 are set forth as follows: TTL=5.003; f1=4.373; f2=−10.633; f3=−37.031; f4=6.865; f5=2.536; f6=−1.726; f=4.251;

$$f1.2.3/Dr1r6=5.930$$

$$T3.5/TTL=0.334$$

$$SAG61/CT6=-3.784$$

System parameters: ⅓" sensor element, aperture value=2.05

TABLE 1

| Surface Type | Radius of Curvature | Thickness | Material | Effective Aperture Diameter | Conical Coefficient |
|---|---|---|---|---|---|
| Spherical | Infinite | Infinite | | | |
| Spherical | Infinite | −0.3460 | | 2.0736 | |
| Aspherical | 1.7080 | 0.5408 | 1.544/56.11 | 2.1336 | −0.0731 |
| Aspherical | 5.3321 | 0.0614 | | 2.1415 | −54.2177 |
| Aspherical | 6.2657 | 0.2130 | 1.635/23.78 | 2.1478 | −49.7859 |
| Aspherical | 3.2195 | 0.1263 | | 2.1411 | 0.3020 |
| Aspherical | 2.3343 | 0.2758 | 1.635/23.78 | 2.1709 | −6.6575 |
| Aspherical | 2.0270 | 0.3873 | | 2.2382 | 1.5324 |
| Aspherical | 10.5973 | 0.6001 | 1.544/56.11 | 2.6000 | 2.1419 |
| Aspherical | −5.6832 | 0.6856 | | 2.8912 | 2.5012 |
| Aspherical | 14869.9392 | 0.5083 | 1.544/56.11 | 3.2798 | −0.0008 |
| Aspherical | −1.3847 | 0.2553 | | 3.8377 | −6.6693 |
| Aspherical | −1.8254 | 0.2250 | 1.544/56.11 | 4.0953 | −0.3186 |
| Aspherical | 2.0326 | 0.2500 | | 4.9209 | −21.7455 |
| Spherical | Infinite | 0.2100 | 1.517/64.17 | 5.7368 | |
| Spherical | Infinite | 0.6644 | | 5.8650 | |
| Spherical | Infinite | | | 6.4927 | |

The following table lists the high-order coefficients A4, A6, A8, A10, A12 and A14 of the aspherical surfaces of the aspheric lenses:

TABLE 2

| A4 | A6 | A8 | A10 | A12 | A14 |
|---|---|---|---|---|---|
| −4.5094E−03 | 6.0316E−03 | −5.3245E−03 | 2.3633E−03 | 0 | 0 |
| −8.7677E−02 | 6.5491E−02 | −4.6237E−03 | −8.9553E−03 | 0 | 0 |
| −5.7832E−02 | 6.6075E−02 | −1.0391E−03 | −1.6428E−02 | 0 | 0 |
| 4.6129E−04 | 2.2483E−02 | −8.9304E−03 | 3.8259E−03 | 0 | 0 |
| −8.5509E−02 | −1.5092E−02 | 9.6047E−03 | 2.0928E−02 | 0 | 0 |
| −1.4843E−01 | 5.8028E−03 | 1.1512E−02 | 3.8046E−03 | 0 | 0 |
| −2.4438E−02 | −3.0831E−03 | 1.9532E−03 | 2.2855E−03 | 0 | 0 |
| −4.6967E−02 | 4.1786E−03 | −4.5478E−03 | 3.2095E−03 | 0 | 0 |
| −8.0286E−02 | −5.8820E−04 | 1.9018E−03 | −9.0114E−04 | 0 | 0 |
| −6.7748E−02 | 4.3188E−02 | −1.1749E−02 | 1.1822E−03 | 0 | 0 |
| 5.1088E−02 | 5.2193E−05 | −2.5020E−03 | 4.4964E−04 | 7.5609E−06 | 2.7841E−06 |
| −2.4774E−02 | 2.1228E−03 | −6.1181E−04 | 2.7705E−05 | 1.5176E−06 | −4.5550E−07 |

Figure 6:
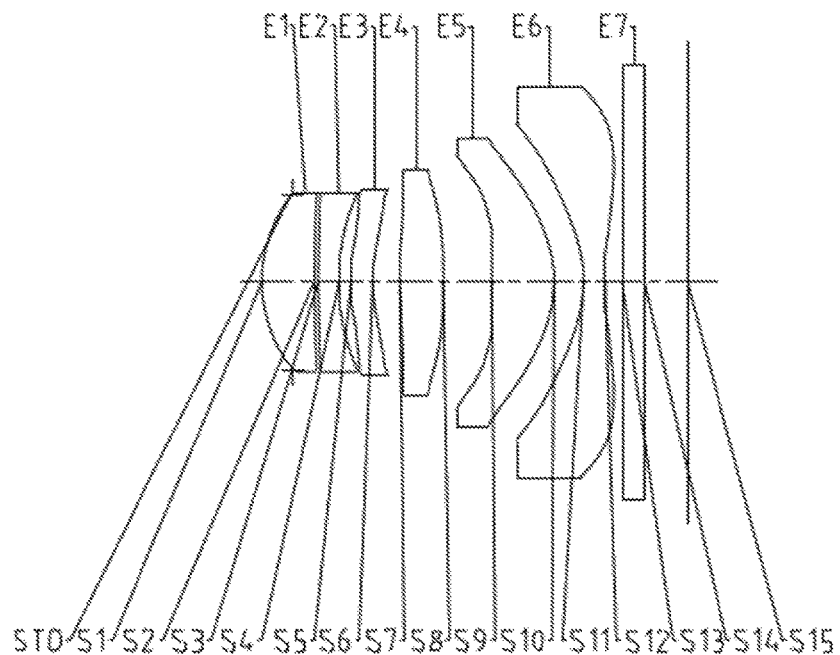
FIG. 6 is a schematic diagram of an Embodiment 2 of the image pick-up lens system provided in the present invention.

As shown in FIG. 6, the image pick-up lens system provided in Embodiment 2 of the present invention comprises the following components arranged sequentially from the object side to the image side: a diaphragm, a first lens E1, a second lens E2, a third lens E3, a fourth lens E4, a fifth lens E5, a sixth lens E6, a filter lens E7, and an imaging plane. The first lens E1 has positive focal power, with a convex object-side surface; the second lens E2 has negative focal power, with a convex object-side surface; the third lens E3 has negative focal power, with a concave image-side surface; the image-side surface of the fourth lens E4 is a convex surface; the fifth lens E5 has positive focal power, with a convex image-side surface, and the positive focal power near the optical axis turns to be negative focal power towards the circumference; the sixth lens E6 has positive focal power at the circumference, with a concave image-side surface near the optical axis. In the image pick-up lens system, at least one lens surface is an aspherical surface.

From the object side to the image side, the diaphragm has its plane denoted as ST0, the two sides of the first lens E1 are denoted as S1 and S2, the two sides of the second lens E2 are denoted as S3 and S4, the two sides of the third lens E3 are denoted as S5 and S6, the two sides of the fourth lens E4 are denoted as S7 and S8, the two sides of the fifth lens E5 are denoted as S9 and S10, the two sides of the sixth lens E6 are denoted as S11 and S12, the two sides of the filter lens E7 are denoted as S13 and S14, and the imaging plane is denoted as S15.

The parameters of the image pick-up lens system in the Embodiment 2 are set forth as follows: TTL=4.022; f1=2.974; f2=−5.412; f3=−26.811; f4=5.851; f5=2.160; f6=−1.486; f=3.346;

$$f1.2.3/Dr1r6=5.650$$

$$T3.5/TTL=0.281$$

$$SAG61/CT6=-3.154$$

System parameters: ¼" sensor element, aperture value=2.05

TABLE 3

| Surface Type | Radius of Curvature | Thickness | Material | Effective Aperture Diameter | Conical Coefficient |
|---|---|---|---|---|---|
| Spherical | Infinite | Infinite | | | |
| Spherical | Infinite | −0.2799 | | 1.6320 | |
| Aspherical | 1.3344 | 0.4935 | 1.544/56.11 | 1.6873 | −0.2928 |
| Aspherical | 6.5034 | 0.0368 | | 1.6719 | −6.7573 |
| Aspherical | 9.3518 | 0.1996 | 1.635/23.78 | 1.6659 | 21.8315 |
| Aspherical | 2.5075 | 0.1130 | | 1.6719 | 3.5516 |
| Aspherical | 1.6622 | 0.2030 | 1.635/23.78 | 1.6891 | −5.5824 |
| Aspherical | 1.4432 | 0.2552 | | 1.7509 | 1.3989 |
| Aspherical | 5.1049 | 0.4165 | 1.544/56.11 | 1.9415 | −2.4065 |
| Aspherical | −8.2880 | 0.4595 | | 2.1155 | 23.7865 |
| Aspherical | −38.0065 | 0.5880 | 1.544/56.11 | 2.4013 | −487.0483 |
| Aspherical | −1.1498 | 0.2771 | | 2.7086 | −4.7886 |
| Aspherical | −1.2522 | 0.2007 | 1.544/56.11 | 2.9796 | −0.4079 |
| Aspherical | 2.4366 | 0.1628 | | 3.6919 | −30.2701 |
| Spherical | Infinite | 0.2100 | 1.517/64.17 | 3.9863 | |
| Spherical | Infinite | 0.4063 | | 4.0915 | |
| Spherical | Infinite | | | 4.5632 | |

The following table lists the high-order coefficients A4, A6, A8, A10, A12 and A14 of the aspherical surfaces of the aspheric lenses:

TABLE 4

| A4 | A6 | A8 | A10 | A12 | A14 |
|---|---|---|---|---|---|
| 4.5647E−03 | 4.4233E−02 | −4.9011E−02 | 7.5006E−02 | 0 | 0 |
| −2.5592E−01 | 5.0862E−01 | −1.9171E−01 | −2.1491E−01 | 0 | 0 |
| −1.2083E−01 | 2.9265E−01 | 1.1588E−01 | −5.3266E−01 | 0 | 0 |

TABLE 4-continued

| A4 | A6 | A8 | A10 | A12 | A14 |
|---|---|---|---|---|---|
| 3.7852E−02 | −8.1153E−02 | 2.6971E−01 | −2.7776E−01 | 0 | 0 |
| −2.3960E−01 | −9.3767E−02 | 6.4117E−02 | 2.5680E−01 | 0 | 0 |
| −4.3926E−01 | −7.4167E−03 | 7.0227E−03 | 2.0574E−02 | 0 | 0 |
| −7.9927E−02 | 5.7184E−02 | −1.5487E−01 | 1.1219E−01 | 0 | 0 |
| −1.2988E−01 | 9.2774E−02 | −1.2388E−01 | 8.8193E−02 | 0 | 0 |
| −2.1309E−01 | 8.5104E−02 | −1.2687E−01 | 6.7161E−02 | 0 | 0 |
| −1.7997E−01 | 1.7827E−01 | −1.0882E−01 | 2.7445E−02 | 0 | 0 |
| 1.2779E−01 | 3.1628E−02 | −2.8261E−02 | 2.5720E−03 | 1.7468E−04 | 6.8702E−04 |
| −4.2997E−02 | 1.3463E−02 | −6.0802E−03 | 5.7070E−04 | −3.6836E−05 | 1.6051E−05 |

Figure 11:
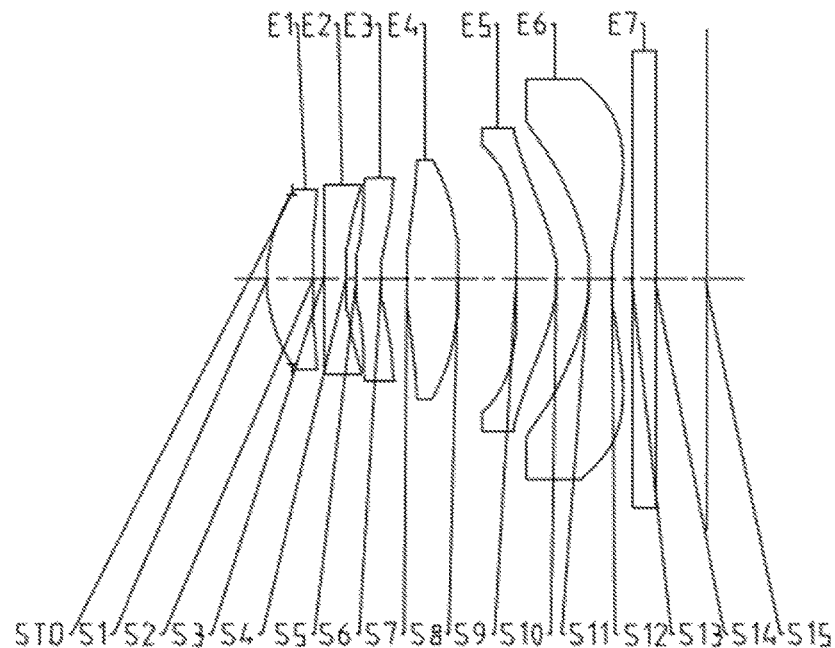
FIG. 11 is a schematic diagram of an Embodiment 3 of the image pick-up lens system provided in the present invention.
Figure 12:
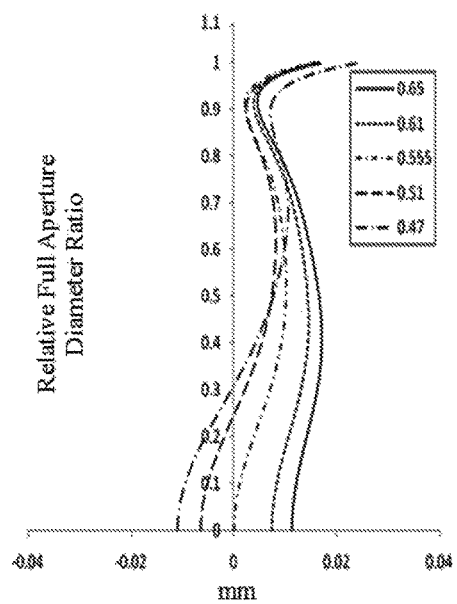
FIG. 12 is a longitudinal aberration curve (mm) of the Embodiment 3.
Figure 13:
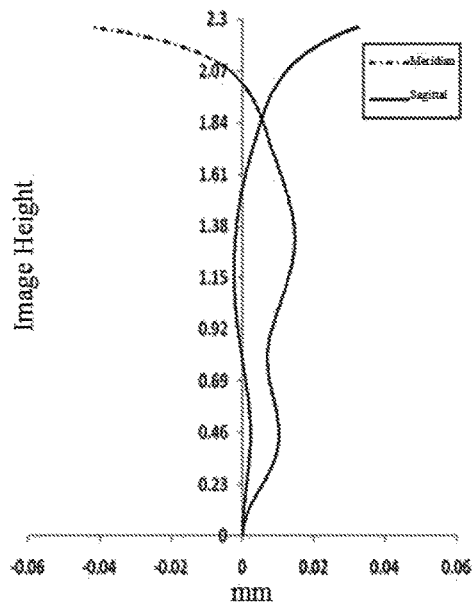
FIG. 13 is an astigmatic diagram (mm) of the Embodiment 3.
Figure 17:
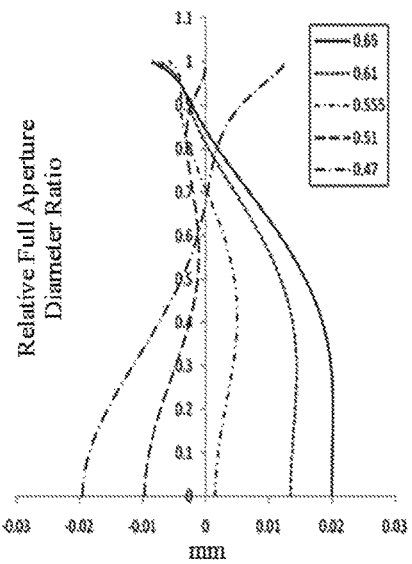
FIG. 17 is a longitudinal aberration curve (mm) of the Embodiment 4.
Figure 18:
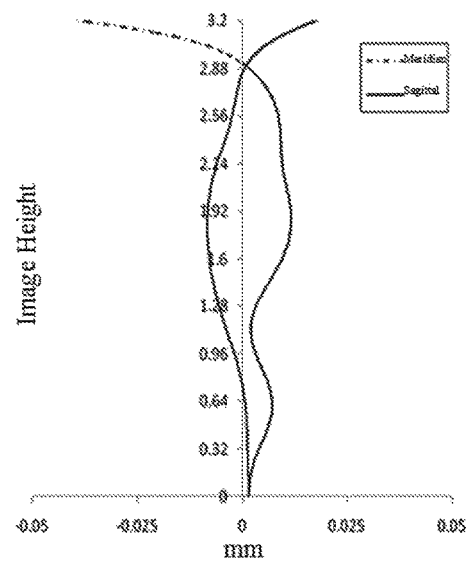
FIG. 18 is an astigmatic diagram (mm) of the Embodiment 4.
Figure 19:
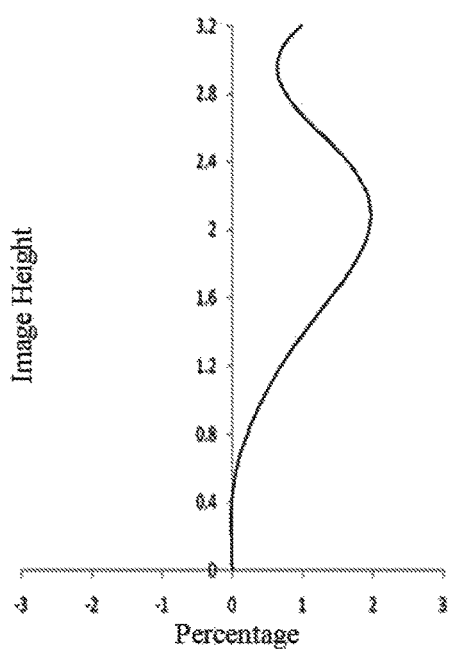
FIG. 19 is a distortion diagram (%) of the Embodiment 4.
Figure 20:
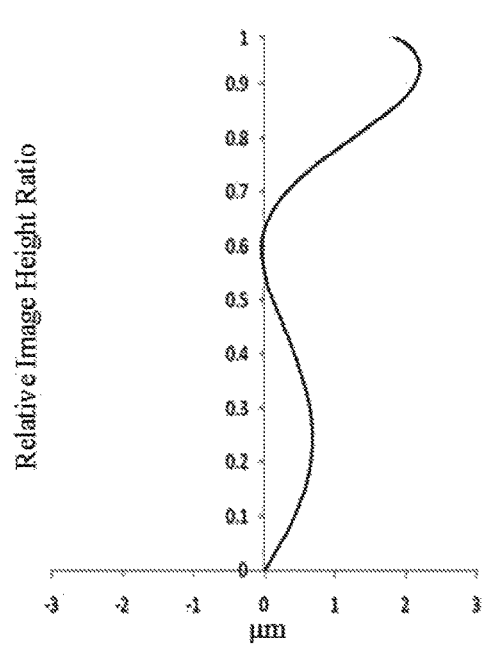
FIG. 20 is a lateral color curve (μm) of the Embodiment 4.

As shown in FIG. 11, the image pick-up lens system provided in Embodiment 3 of the present invention comprises the following components arranged sequentially from the object side to the image side: a diaphragm, a first lens E1, a second lens E2, a third lens E3, a fourth lens E4, a fifth lens E5, a sixth lens E6, a filter lens E7, and an imaging plane. The first lens E1 has positive focal power, with a convex object-side surface; the second lens E2 has negative focal power, with a convex object-side surface; the third lens E3 has negative focal power, with a concave image-side surface; the image-side surface of the fourth lens E4 is a convex surface; the fifth lens E5 has positive focal power, with a convex image-side surface, and the positive focal power near the optical axis turns to be negative focal power towards the circumference; the sixth lens E6 has positive focal power at the circumference, with a concave image-side surface near the optical axis. In the image pick-up lens system, at least one lens surface is an aspherical surface.

From the object side to the image side, the diaphragm has its plane denoted as ST0, the two sides of the first lens E1 are denoted as S1 and S2, the two sides of the second lens E2 are denoted as S3 and S4, the two sides of the third lens E3 are denoted as S5 and S6, the two sides of the fourth lens E4 are denoted as S7 and S8, the two sides of the fifth lens E5 are denoted as S9 and S10, the two sides of the sixth lens E6 are denoted as S11 and S12, the two sides of the filter lens E7 are denoted as S13 and S14, and the imaging plane is denoted as S15.

The parameters of the image pick-up lens system in the Embodiment 3 are set forth as follows: TTL=3.993; f1=3.785; f2=−6.325; f3=−20.054; f4=3.693; f5=2.268; f6=−1.482; f=3.219;

$f1.2.3/Dr1r6=9.487$ $T3.5/TTL=0.309$ $SAG61/CT6=-2.777$

System parameters: ¼" sensor element, aperture value=2.05

TABLE 5

| Surface Type | Radius of Curvature | Thickness | Material | Effective Aperture Diameter | Conical Coefficient |
|---|---|---|---|---|---|
| Spherical | Infinite | Infinite | | | |
| Spherical | Infinite | −0.2256 | | 1.5701 | |
| Aspherical | 1.4780 | 0.4185 | 1.544/56.11 | 1.6183 | −0.0943 |
| Aspherical | 4.6718 | 0.0921 | | 1.6336 | −24.6257 |
| Aspherical | 7.4401 | 0.2078 | 1.635/23.78 | 1.6429 | −99.2317 |
| Aspherical | 2.5937 | 0.0933 | | 1.7301 | −1.8098 |
| Aspherical | 1.6733 | 0.2260 | 1.635/23.78 | 1.7480 | −5.8101 |
| Aspherical | 1.4024 | 0.2326 | | 1.8435 | 1.0453 |
| Aspherical | 3.2548 | 0.4697 | 1.544/56.11 | 2.0809 | 0.2843 |
| Aspherical | −5.0266 | 0.5320 | | 2.1961 | −24.5164 |
| Aspherical | −181.5333 | 0.3627 | 1.544/56.11 | 2.4753 | −4591.7228 |
| Aspherical | −1.2305 | 0.2981 | | 2.7665 | −6.5392 |
| Aspherical | −1.3953 | 0.2090 | 1.544/56.11 | 2.9475 | −0.3001 |
| Aspherical | 2.0262 | 0.1772 | | 3.6604 | −22.4660 |
| Spherical | Infinite | 0.2100 | 1.517/64.17 | 4.0698 | |
| Spherical | Infinite | 0.4634 | | 4.1944 | |
| Spherical | Infinite | | | 4.5944 | |

The following table lists the high-order coefficients A4, A6, A8, A10, A12 and A14 of the aspherical surfaces of the aspheric lenses:

TABLE 6

| A4 | A6 | A8 | A10 | A12 | A14 |
|---|---|---|---|---|---|
| −2.0248E−02 | 4.9624E−02 | −4.6906E−02 | 8.0212E−02 | 0 | 0 |
| −2.2791E−01 | 3.7448E−01 | −8.8344E−02 | −1.6574E−01 | 0 | 0 |
| −1.6923E−01 | 3.4678E−01 | −6.3662E−02 | −3.8994E−01 | 0 | 0 |
| −1.6354E−02 | 1.2056E−01 | −3.1453E−02 | −1.5844E−01 | 0 | 0 |
| −2.4443E−01 | −7.5184E−02 | 9.8664E−02 | 1.1197E−01 | 0 | 0 |

TABLE 6-continued

| A4 | A6 | A8 | A10 | A12 | A14 |
|---|---|---|---|---|---|
| −4.6821E−01 | 1.8071E−02 | 4.0816E−02 | −5.9198E−02 | 0 | 0 |
| −6.9107E−02 | 1.5458E−02 | −4.7668E−02 | 3.0030E−02 | 0 | 0 |
| −1.2853E−01 | 3.1194E−02 | −2.4841E−02 | 1.9951E−02 | 0 | 0 |
| −1.5412E−01 | 4.2114E−02 | −2.5689E−02 | 3.9569E−03 | 0 | 0 |
| −1.5016E−01 | 2.3346E−01 | −1.3015E−01 | 2.6475E−02 | 0 | 0 |
| 1.1995E−01 | 5.6832E−03 | −3.0674E−02 | 9.3498E−03 | 4.2930E−04 | 1.8110E−04 |
| −4.5190E−02 | 6.1988E−03 | −4.4746E−03 | 5.2191E−04 | 8.7201E−06 | 3.5817E−06 |

As shown in FIG. 16, the image pick-up lens system provided in Embodiment 4 of the present invention comprises the following components arranged sequentially from the object side to the image side: a diaphragm, a first lens E1, a second lens E2, a third lens E3, a fourth lens E4, a fifth lens E5, a sixth lens E6, a filter lens E7, and an imaging plane. The first lens E1 has positive focal power, with a convex object-side surface; the second lens E2 has negative focal power, with a convex object-side surface, the third lens E3 has negative focal power, with a concave image-side surface; the image-side surface of the fourth lens E4 is a convex surface; the fifth lens E5 has positive focal power, with a convex image-side surface, and the positive focal power near the optical axis turns to be negative focal power towards the circumference; the sixth lens E6 has positive focal power at the circumference, with a concave image-side surface near the optical axis. In the image pick-up lens system, at least one lens surface is an aspherical surface.

From the object side to the image side, the diaphragm has its plane denoted as ST0, the two sides of the first lens E1 are denoted as S1 and S2, the two sides of the second lens E2 are denoted as S3 and S4, the two sides of the third lens E3 are denoted as S5 and S6, the two sides of the fourth lens E4 are denoted as S7 and S8, the two sides of the fifth lens E5 are denoted as S9 and S10, the two sides of the sixth lens E6 are denoted as S11 and S12, the two sides of the filter lens E7 are denoted as S13 and S14, and the imaging plane is denoted as S15.

The parameters of the image pick-up lens system in the Embodiment 4 are set forth as follows: TTL=5.00; f1=4.372; f2=−9.631; f3=−41.768; f4=6.347; f5=2.670; f6=−1.749; f=4.151;

$$f1.2.3/Dr1r6=6.549$$

$$T3.5/TTL=0.340$$

$$SAG61/CT6=-4.368$$

System parameters: ⅓" sensor element, aperture value=2.05

TABLE 7

| Surface Type | Radius of Curvature | Thickness | Material | Effective Aperture Diameter | Conical Coefficient |
|---|---|---|---|---|---|
| Spherical | Infinite | Infinite | | | |
| Spherical | Infinite | −0.3375 | | 2.0251 | |
| Aspherical | 1.7059 | 0.5062 | 1.544/56.11 | 2.0890 | −0.0416 |
| Aspherical | 5.3544 | 0.0757 | | 2.0882 | −53.1547 |
| Aspherical | 6.7536 | 0.2130 | 1.635/23.78 | 2.0877 | −64.2148 |
| Aspherical | 3.1837 | 0.1178 | | 2.0943 | −0.0643 |
| Aspherical | 2.3145 | 0.2538 | 1.635/23.78 | 2.1094 | −7.0819 |
| Aspherical | 2.0390 | 0.3698 | | 2.2228 | 1.5293 |
| Aspherical | 11.7195 | 0.6393 | 1.544/56.11 | 2.6000 | 12.7906 |
| Aspherical | −4.8248 | 0.6930 | | 2.8714 | 0.4313 |
| Aspherical | −31.7345 | 0.5418 | 1.544/56.11 | 3.3099 | −24.2930 |
| Aspherical | −1.4022 | 0.3238 | | 3.7524 | −5.6530 |
| Aspherical | −1.7244 | 0.2250 | 1.544/56.11 | 3.9632 | −0.4222 |
| Aspherical | 2.2397 | 0.2500 | | 5.0395 | −22.3361 |
| Spherical | Infinite | 0.2100 | 1.517/64.17 | 5.8281 | |
| Spherical | Infinite | 0.5809 | | 5.9568 | |
| Spherical | Infinite | | | 6.5302 | |

The following table lists the high-order coefficients A4, A6, A8, A10, A12 and A14 of the aspherical surfaces of the aspheric lenses:

TABLE 8

| A4 | A6 | A8 | A10 | A12 | A14 |
|---|---|---|---|---|---|
| −4.5236E−03 | 1.0363E−02 | −2.9652E−03 | 3.7644E−03 | 0 | 0 |
| −8.3234E−02 | 7.1475E−02 | −3.7506E−03 | −1.6994E−02 | 0 | 0 |
| −5.9916E−02 | 6.5451E−02 | −2.7719E−03 | −2.4135E−02 | 0 | 0 |
| −9.0841E−04 | 1.7726E−02 | −9.8418E−03 | 5.6343E−04 | 0 | 0 |
| −8.8827E−02 | −2.1146E−02 | 1.3512E−03 | 1.8005E−02 | 0 | 0 |
| −1.5612E−01 | 7.1981E−03 | 1.0232E−02 | 2.2272E−03 | 0 | 0 |
| −2.3692E−02 | 6.3465E−04 | 1.4016E−03 | 9.2135E−04 | 0 | 0 |
| −4.4245E−02 | 5.0386E−03 | −5.3424E−03 | 2.1275E−03 | 0 | 0 |

TABLE 8-continued

| A4 | A6 | A8 | A10 | A12 | A14 |
|---|---|---|---|---|---|
| −7.0820E−02 | 4.2424E−03 | 1.4341E−03 | −1.1185E−03 | 0 | 0 |
| −7.3912E−02 | 4.3543E−02 | −1.1592E−02 | 1.1835E−03 | 0 | 0 |
| 4.4218E−02 | −2.8754E−04 | −2.5484E−03 | 4.2749E−04 | 5.8204E−06 | 4.8611E−06 |
| −2.2877E−02 | 2.7012E−03 | −6.8090E−04 | 2.7496E−05 | 2.0269E−06 | −3.2882E−07 |

Figure 21:
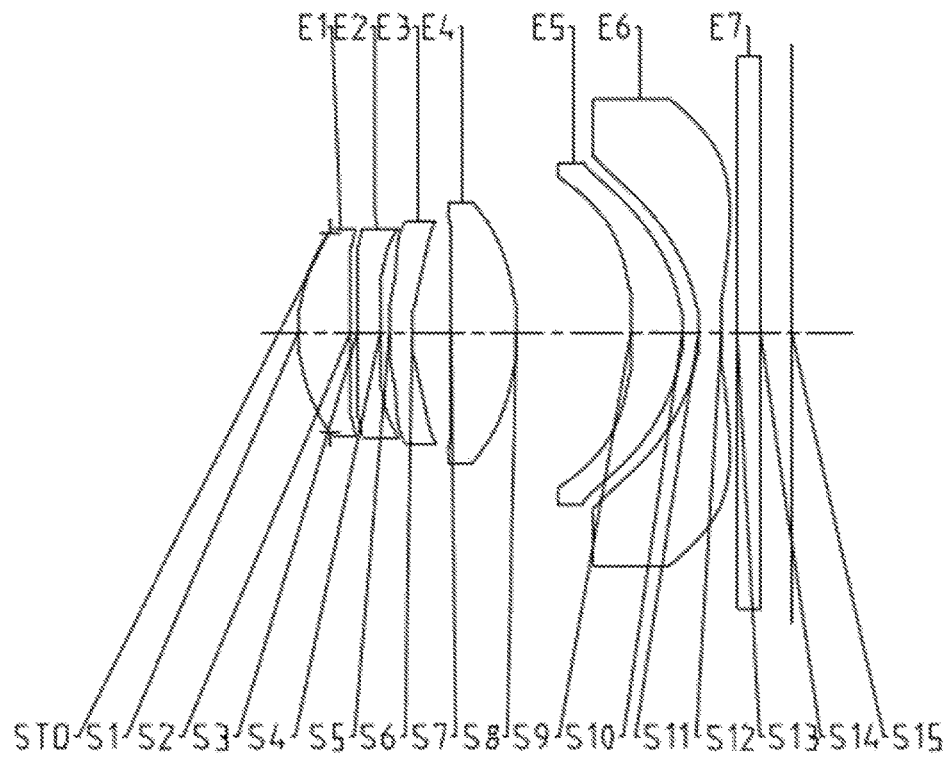
FIG. 21 is a schematic diagram of an Embodiment 5 of the image pick-up lens system provided in the present invention.
Figure 22:
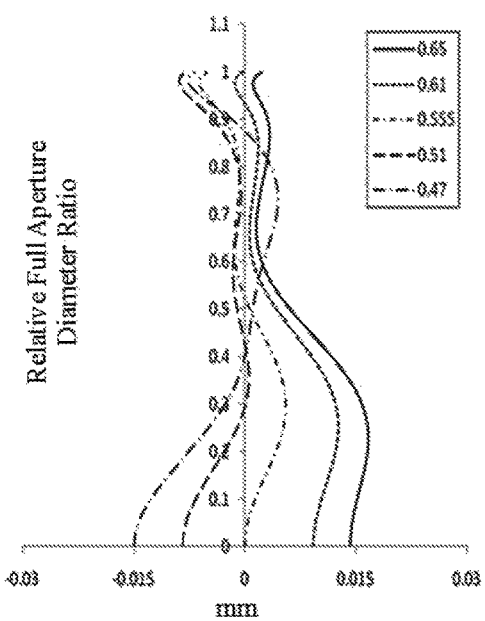
FIG. 22 is a longitudinal aberration curve (mm) of the Embodiment 5.
Figure 23:
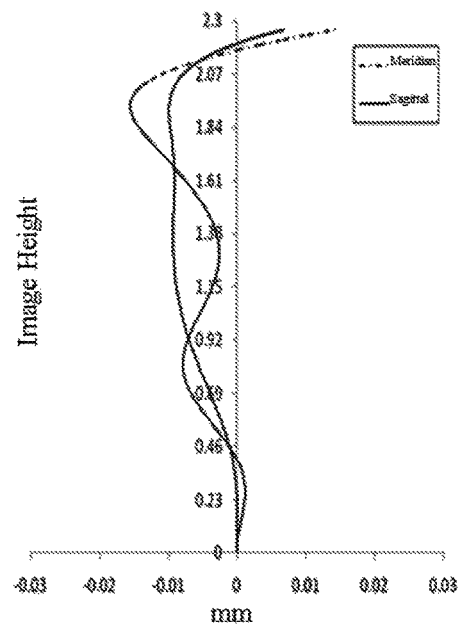
FIG. 23 is an astigmatic diagram (mm) of the Embodiment 5.
Figures 24, 25:
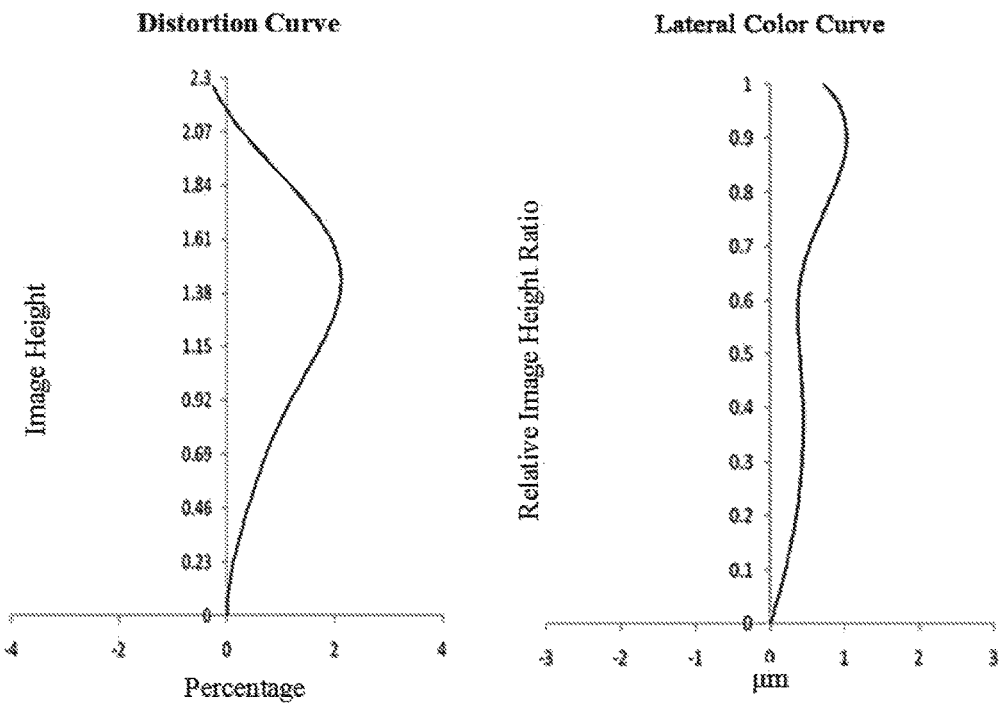
FIG. 24 is a distortion diagram (%) of the Embodiment 5.
FIG. 25 is a lateral color curve (μm) of the Embodiment 5.

As shown in FIG. 21, the image pick-up lens system provided in Embodiment 5 of the present invention comprises the following components arranged sequentially from the object side to the image side: a diaphragm, a first lens E1, a second lens E2, a third lens E3, a fourth lens E4, a fifth lens E5, a sixth lens E6, a filter lens E7, and an imaging plane. The first lens E1 has positive focal power, with a convex object-side surface; the second lens E2 has negative focal power, with a convex object-side surface; the third lens E3 has negative focal power, with a concave image-side surface; the image-side surface of the fourth lens E4 is a convex surface; the fifth lens E5 has positive focal power, with a convex image-side surface, and the positive focal power near the optical axis turns to be negative focal power towards the circumference; the sixth lens E6 has positive focal power at the circumference, with a concave image-side surface near the optical axis. In the image pick-up lens system, at least one lens surface is an aspherical surface.

From the object side to the image side, the diaphragm has its plane denoted as ST0, the two sides of the first lens E1 are denoted as S1 and S2, the two sides of the second lens E2 are denoted as S3 and S4, the two sides of the third lens E3 are denoted as S5 and S6, the two sides of the fourth lens E4 are denoted as S7 and S8, the two sides of the fifth lens E5 are denoted as S9 and S10, the two sides of the sixth lens E6 are denoted as S11 and S12, the two sides of the filter lens E7 are denoted as S13 and S14, and the imaging plane is denoted as S15.

The parameters of the image pick-up lens system in the Embodiment 5 are set forth as follows: TTL=4.395; f1=3.777; f2=−16.447; f3=−8.453; f4=3.501; f5=3.141; f6=−1.604; f=3.631;

$$f1.2.3/Dr1r6=7.681,$$

$$T3.5/TTL=0.443,$$

$$SAG61/CT6=-4.720$$

System parameters: ¼" sensor element, aperture value=2.05

TABLE 9

| Surface Type | Radius of Curvature | Thickness | Material | Effective Aperture Diameter | Conical Coefficient |
|---|---|---|---|---|---|
| Spherical | Infinite | Infinite | | | |
| Spherical | Infinite | −0.2696 | | 1.7713 | |
| Aspherical | 1.5714 | 0.4624 | 1.544/56.11 | 1.8292 | −0.0059 |
| Aspherical | 5.9169 | 0.0626 | | 1.8279 | −20.5889 |
| Aspherical | 387.1453 | 0.2037 | 1.635/23.78 | 1.8421 | −170.0000 |
| Aspherical | 10.2500 | 0.0833 | | 1.8572 | 48.9379 |
| Aspherical | 1.7304 | 0.2003 | 1.635/23.78 | 1.9163 | −8.2335 |
| Aspherical | 1.2519 | 0.3483 | | 1.9656 | 0.3803 |
| Aspherical | 12.8277 | 0.5817 | 1.544/56.11 | 2.1268 | 57.4484 |
| Aspherical | −2.2099 | 1.0206 | | 2.3316 | −5.8075 |
| Aspherical | −4.1435 | 0.4572 | 1.544/56.11 | 2.7767 | −17.5422 |
| Aspherical | −1.2602 | 0.1433 | | 3.0357 | −6.0052 |
| Aspherical | −1.2848 | 0.2010 | 1.544/56.11 | 3.1486 | −0.3671 |
| Aspherical | 2.9008 | 0.1423 | | 4.1581 | −36.8584 |
| Spherical | Infinite | 0.2100 | 1.517/64.17 | 4.7714 | |
| Spherical | Infinite | 0.2785 | | 4.9075 | |
| Spherical | Infinite | | | 5.1588 | |

The following table lists the high-order coefficients A4, A6, A8, A10, A12 and A14 of the aspherical surfaces of the aspheric lenses:

TABLE 10

| A4 | A6 | A8 | A10 | A12 | A14 |
|---|---|---|---|---|---|
| −4.6616E−03 | 2.1201E−02 | −7.7365E−02 | 8.3491E−02 | 0 | 0 |
| −2.4940E−01 | 3.4232E−01 | −6.6359E−02 | −3.1143E−02 | 0 | 0 |
| −1.2918E−01 | 3.6001E−01 | −3.4665E−02 | −1.6539E−01 | 0 | 0 |
| 3.9831E−02 | 1.5138E−01 | 4.7958E−02 | −9.1568E−02 | 0 | 0 |
| −2.9759E−01 | 3.3897E−02 | 3.4835E−01 | −1.3787E−01 | 0 | 0 |
| −5.2380E−01 | 1.7847E−01 | 9.1038E−02 | −1.2037E−01 | 0 | 0 |
| −2.0833E−02 | −3.8250E−02 | −4.7885E−02 | 4.3734E−02 | 0 | 0 |
| −8.9686E−02 | 4.7810E−02 | −7.1729E−02 | 3.0582E−02 | 0 | 0 |
| −1.6939E−01 | 6.4074E−02 | −3.5564E−02 | 6.5998E−03 | 0 | 0 |
| −2.2698E−01 | 2.0498E−01 | −1.2096E−01 | 2.6056E−02 | 0 | 0 |
| 5.3770E−02 | 3.8087E−02 | −3.9692E−02 | 8.8065E−03 | 9.3537E−04 | 3.0611E−04 |
| −3.1578E−02 | 5.0867E−03 | −4.3182E−03 | 6.3696E−04 | 3.6279E−05 | −8.9804E−06 |

Figure 26:
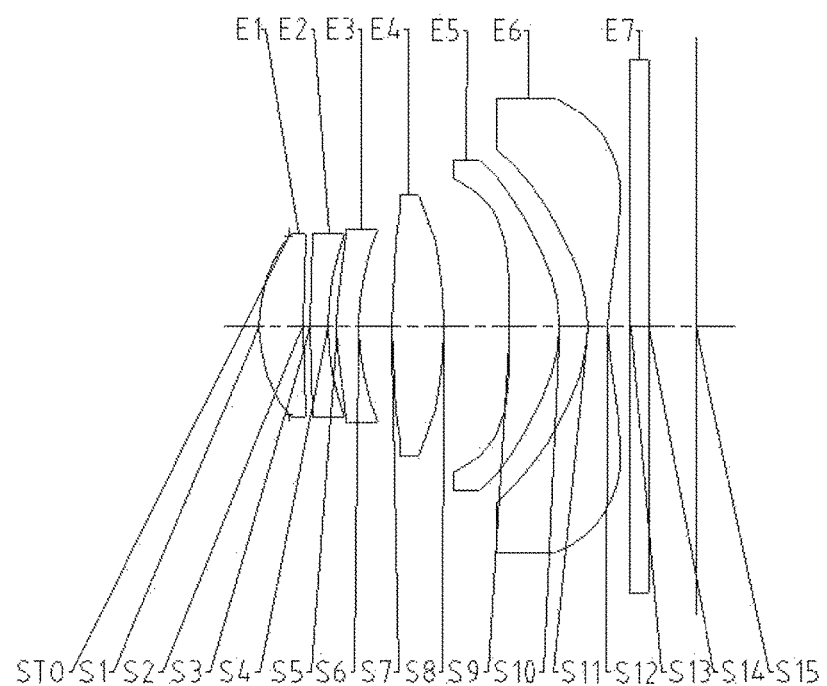
FIG. 26 is a schematic diagram of an Embodiment 6 of the image pick-up lens system provided in the present invention.
Figure 27:
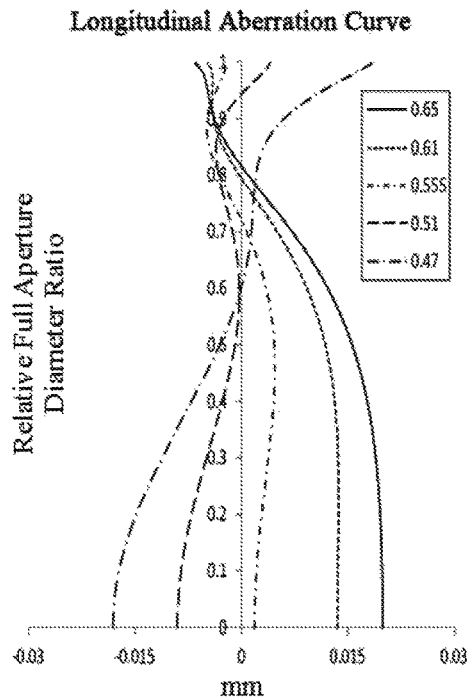
FIG. 27 is a longitudinal aberration curve (mm) of the Embodiment 6.
Figure 28:
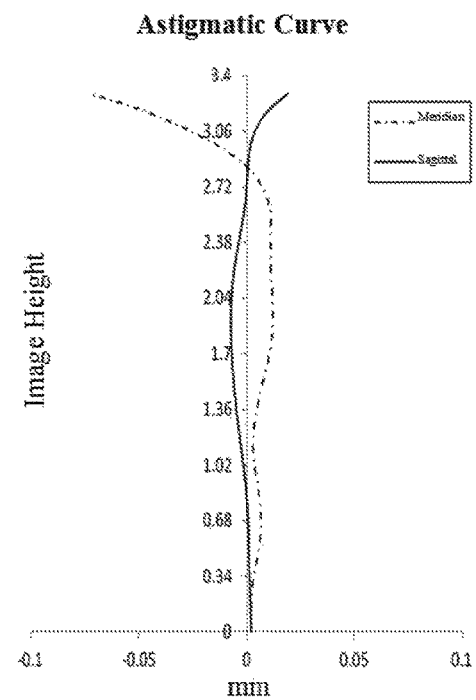
FIG. 28 is an astigmatic diagram (mm) of the Embodiment 6.
Figure 29:
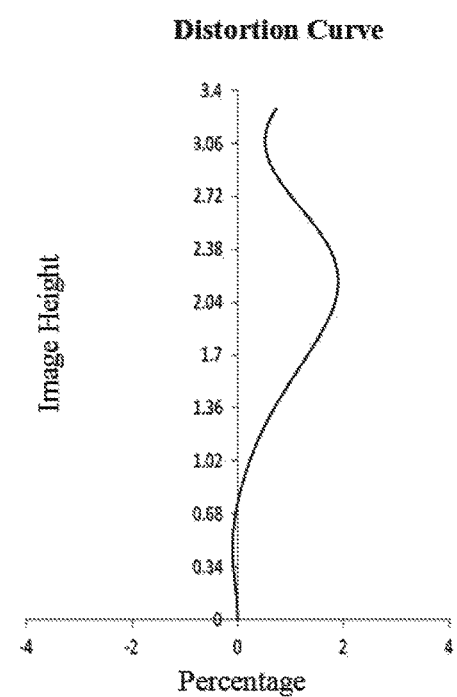
FIG. 29 is a distortion diagram (%) of the Embodiment 6.
Figure 30:
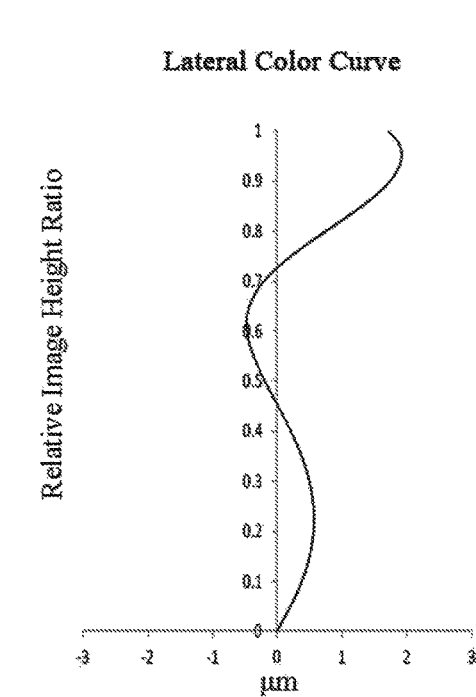
FIG. 30 is a lateral color curve (μm) of the Embodiment 6.

As shown in FIG. 26, the image pick-up lens system provided in Embodiment 6 of the present invention comprises the following components arranged sequentially from the object side to the image side: a diaphragm, a first lens E1, a second lens E2, a third lens E3, a fourth lens E4, a fifth lens E5, a sixth lens E6, a filter lens E7, and an imaging plane. The first lens E1 has positive focal power, with a convex object-side surface; the second lens E2 has negative focal power, with a convex object-side surface; the third lens E3 has negative focal power, with a concave image-side surface; the image-side surface of the fourth lens E4 is a convex surface; the fifth lens E5 has positive focal power, with a convex image-side surface, and the positive focal power near the optical axis turns to be negative focal power towards the circumference; the sixth lens E6 has positive focal power at the circumference, with a concave image-side surface near the optical axis. In the image pick-up lens system, at least one lens surface is an aspherical surface.

From the object side to the image side, the diaphragm has its plane denoted as ST0, the two sides of the first lens E1 are denoted as S1 and S2, the two sides of the second lens E2 are denoted as S3 and S4, the two sides of the third lens E3 are denoted as S5 and S6, the two sides of the fourth lens E4 are denoted as S7 and S8, the two sides of the fifth lens E5 are denoted as S9 and S10, the two sides of the sixth lens E6 are denoted as S11 and S12, the two sides of the filter lens E7 are denoted as S13 and S14, and the imaging plane is denoted as S15.

The parameters of the image pick-up lens system in the Embodiment 6 are set forth as follows: TTL=5.00; f1=4.418; f2=−10.012; f3=−31.497; f4=6.368; f5=2.678; f6=−1.738; f=4.171;

$$f1.2.3/Dr1r6=7.005$$

$$T3.5/TTL=0.346$$

$$SAG61/CT6=-4.575$$

System parameters: 1/3.06" sensor element, aperture value=2.05

TABLE 11

| Surface Type | Radius of Curvature | Thickness | Material | Effective Aperture Diameter | Conical Coefficient |
|---|---|---|---|---|---|
| Spherical | Infinite | Infinite | | | |
| Spherical | Infinite | −0.3415 | | 2.0348 | |
| Aspherical | 1.7064 | 0.4963 | 1.544/56.11 | 2.0987 | −0.0540 |
| Aspherical | 5.2335 | 0.0895 | | 2.0974 | −52.7886 |
| Aspherical | 6.3872 | 0.2024 | 1.635/23.78 | 2.0964 | −69.9880 |
| Aspherical | 3.1599 | 0.1026 | | 2.1106 | −0.1073 |
| Aspherical | 2.3910 | 0.2501 | 1.635/23.78 | 2.1233 | −6.5835 |
| Aspherical | 2.0503 | 0.3775 | | 2.2204 | 1.5993 |
| Aspherical | 8.0124 | 0.6035 | 1.544/56.11 | 2.6497 | 12.5046 |
| Aspherical | −5.9782 | 0.7473 | | 2.9960 | −3.3940 |
| Aspherical | 1172.0224 | 0.5693 | 1.544/56.11 | 3.3674 | −2.83E+38 |
| Aspherical | −1.4639 | 0.3279 | | 3.7949 | −5.9684 |
| Aspherical | −1.6621 | 0.2285 | 1.544/56.11 | 4.0548 | −0.4788 |
| Aspherical | 2.3201 | 0.2548 | | 5.2159 | −24.9450 |
| Spherical | Infinite | 0.2100 | 1.517/64.17 | 5.9845 | |
| Spherical | Infinite | 0.5404 | | 6.1119 | |
| Spherical | Infinite | | | 6.6525 | |

The following table lists the high-order coefficients A4, A6, A8, A10, A12 and A14 of the aspherical surfaces of the aspheric lenses:

TABLE 2

| A4 | A6 | A8 | A10 | A12 | A14 |
|---|---|---|---|---|---|
| −5.2708E−03 | 1.0860E−02 | −1.3376E−03 | 2.7433E−03 | 0 | 0 |
| −7.6343E−02 | 6.7897E−02 | −3.6158E−03 | −1.7368E−02 | 0 | 0 |
| −5.6632E−02 | 6.1540E−02 | −9.4918E−04 | −2.6858E−02 | 0 | 0 |
| −9.3143E−04 | 1.3817E−02 | −1.1404E−02 | 4.0330E−03 | 0 | 0 |
| −8.4402E−02 | −2.1938E−02 | 4.4755E−03 | 2.0939E−02 | 0 | 0 |
| −1.5211E−01 | 1.1905E−02 | 9.7627E−03 | 1.1042E−03 | 0 | 0 |
| −2.2157E−02 | 4.4768E−03 | 1.9679E−03 | 5.8285E−05 | 0 | 0 |
| −3.9702E−02 | 6.8141E−03 | −4.4067E−03 | 2.2462E−03 | 0 | 0 |
| −6.1025E−02 | 9.3553E−04 | 2.6727E−04 | −1.0422E−03 | 0 | 0 |
| −6.8589E−02 | 3.7658E−02 | −1.0452E−02 | 9.7048E−04 | 0 | 0 |
| 4.2334E−02 | 2.1350E−03 | −2.1191E−03 | 3.2382E−04 | −7.4755E−06 | 1.5153E−06 |
| −1.9287E−02 | 2.4065E−03 | −5.7238E−04 | 1.9883E−05 | 1.2850E−06 | −1.3332E−07 |

FIGS. 2, 3, 4, and 5 show the longitudinal aberration curve, astigmatic diagram, distortion diagram, and lateral color curve of the Embodiment 1; FIGS. 7, 8, 9, and 10 show the longitudinal aberration curve, astigmatic diagram, distortion diagram, and lateral color curve of the Embodiment 2; FIGS. 12, 13, 14, and 15 show the longitudinal aberration curve, astigmatic diagram, distortion diagram, and lateral color curve of the Embodiment 3; FIGS. 17, 18, 19, and 20 show the longitudinal aberration curve, astigmatic diagram, distortion diagram, and lateral color curve of the Embodiment 4; FIGS. 22, 23, 24, and 25 show the longitudinal aberration curve, astigmatic diagram, distortion diagram, and lateral color curve of the Embodiment 5; FIGS. 27, 28, 29, and 30 show the longitudinal aberration curve, astigmatic diagram, distortion diagram, and lateral color curve of the Embodiment 6. It can be seen from the longitudinal aberration curves, astigmatic diagrams, distortion diagrams, and lateral color curves of the embodiments that the lens system provided in the present invention has favorable optical properties.

Figure 31:
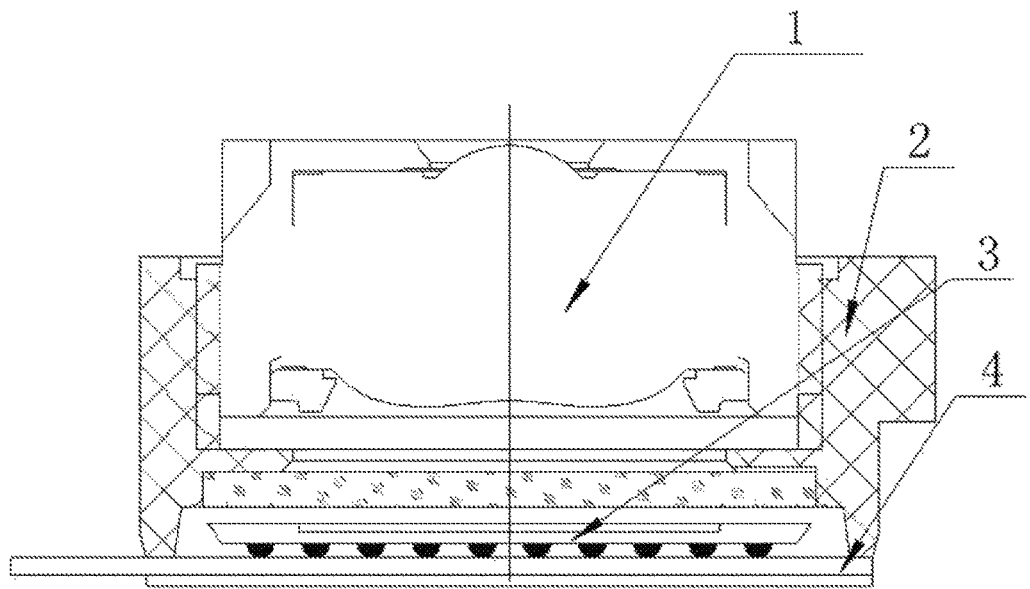
FIG. 31 is a sectional view of an embodiment of an imaging module related to the image pick-up lens system provided in the present invention.
Figure 32:
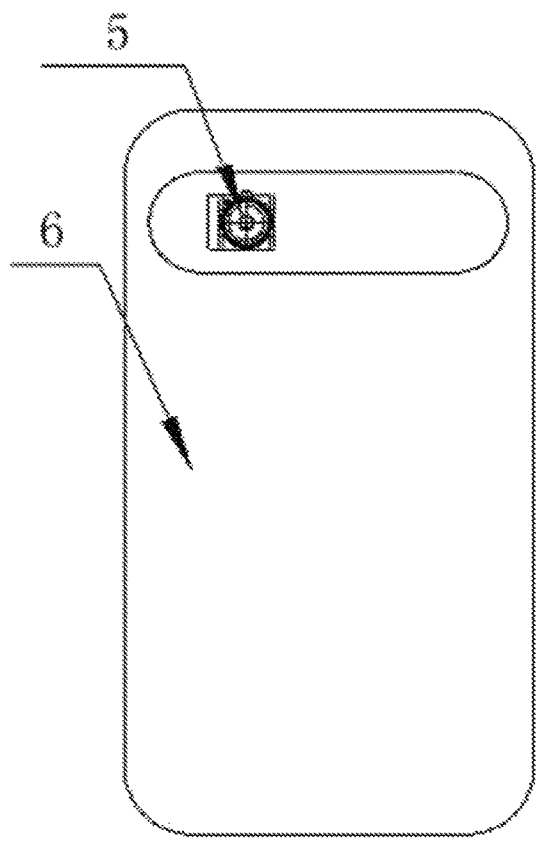
FIG. 32 is a profile diagram of an embodiment of a portable terminal related to the image pick-up lens system provided in the present invention.

As shown in FIG. 31, the imaging module provided in the present invention comprises an image pick-up lens system, a chip, a lens holder, and a base plate. The image pick-up lens system forms an image of the object in a photosensitive area of the chip; the chip carries out photoelectric conversion of the formed image and outputs an electrical signal; the base plate has external connection terminals for outputting the electrical signal; the lens holder has a supporting function.

The present invention further provides a portable terminal having the above-mentioned imaging module, which can be used to obtain high-resolution and high-quality photographic images.

Though the principle and the specific embodiments of the present invention are described hereinbefore for a micro camera lens system, those skilled in the art can, with the above teachings in the present invention, make various modifications and variations on the basis of the above-described embodiments, and all such modifications and variations shall be deemed as falling in the protection scope of the present invention. Those skilled in the art should appreciate that the above specific description is provided only to explain the present invention, but doesn't constitute any limitation to the present invention. The protection scope of the present invention is defined by the claims and the equivalents thereof.

The invention claimed is:

1. An image pick-up lens system, comprising:
lenses arranged sequentially from an object side to an image side, including:
a first lens with positive focal power;
a second lens with negative focal power, having a convex object-side surface and a concave image-side surface;
a third lens with negative focal power;
a fourth lens with positive focal power, an image-side surface of the fourth lens being a convex surface;
a fifth lens with positive focal power, having a convex image-side surface; and
a sixth lens with negative focal power, having a concave image-side surface near an optical axis,
wherein the lenses meet the relational expression: $5.5<f1.2.3/Dr1r6<10$, where $f1.2.3$ is a combined focal length of the first lens, second lens, and third lens; and where Dr1r6 is a spacing from an object-side surface of the first lens to an image-side surface of the third lens on the optical axis,
and wherein the lenses meet the relational expression $-5.0<SAG61/CT6<-2.5$, where SAG61 is a distance from a point of intersection between an object-side surface of the sixth lens and the optical axis to a horizontal displacement of the maximum effective aperture diameter position of the surface on the optical axis, and where CT6 is a central thickness of the sixth lens on the optical axis.

2. The image pick-up lens system according to claim 1, wherein the lenses meet the relational expression $0.25<T3.5/TTL<0.5$,
where T3.5 is a spacing from an image-side surface of the third lens to an object-side surface of the fifth lens on the optical axis, and where TTL is a total length of the entire lens system.

3. The image pick-up lens system according to claim 1 or 2, wherein, in the lens system, an object-side surface of the first lens is a convex surface; and an image-side surface of the third lens is a concave surface.

4. The image pick-up lens system according to claim 3, wherein, in the lens system, the focal power of the fifth lens is positive focal power near the optical axis and turns to be negative focal power towards the circumference; and the focal power of the sixth lens near the circumference is positive focal power.

5. The image pick-up lens system according to any one of claims 1, 2 and 4, wherein a diaphragm is arranged between the object for image pick-up and the first lens.

6. The image pick-up lens system according to claim 5, wherein at least one lens surface is an aspherical surface.

7. The image pick-up lens system according to claim 6, wherein the lenses are plastic aspherical lenses.

8. An imaging module, comprising:
the image pick-up lens system according to claim 1;
a chip;
a lens holder; and
a base plate,
wherein, the image pick-up lens system forms an image of the object in a photosensitive area of the chip; the chip carries out photoelectric conversion of the formed image and outputs an electrical signal; the base plate has external connection terminals for outputting the electrical signal; and the lens holder has a supporting function.

9. A portable terminal, comprising the imaging module according to claim 8.

* * * * *